United States Patent
Park et al.

(10) Patent No.: US 10,197,415 B2
(45) Date of Patent: Feb. 5, 2019

(54) METHOD OF SHARING INFORMATION THROUGH MAP SERVICE AND ELECTRONIC DEVICE THEREFOR

(71) Applicant: Samsung Electronics Co., Ltd., Suwon-si, Gyeonggi-do (KR)

(72) Inventors: Chanpyo Park, Seoul (KR); Hyun Kim, Seoul (KR); Sangwook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 14/846,099

(22) Filed: Sep. 4, 2015

(65) Prior Publication Data

US 2016/0069704 A1    Mar. 10, 2016

(30) Foreign Application Priority Data

Sep. 5, 2014    (KR) ................. 10-2014-0119240

(51) Int. Cl.
| | |
|---|---|
| G01C 21/36 | (2006.01) |
| G06Q 50/00 | (2012.01) |
| G06F 3/0482 | (2013.01) |
| G06F 3/0484 | (2013.01) |
| G06F 3/0488 | (2013.01) |

(52) U.S. Cl.
CPC ....... *G01C 21/3667* (2013.01); *G06F 3/0482* (2013.01); *G06F 3/04842* (2013.01); *G06F 3/04886* (2013.01); *G06Q 50/01* (2013.01)

(58) Field of Classification Search
CPC ............ G01C 21/3667; G01C 21/3664; G01C 21/367–21/3673; G06F 3/0482; G06F 3/04842; G06F 3/04886; G06Q 50/01

USPC .............. 701/532, 516, 517, 522, 537, 538; 340/995.1, 995.12, 995.14–995.16
See application file for complete search history.

(56) References Cited

U.S. PATENT DOCUMENTS

| | | | |
|---|---|---|---|
| 2003/0229441 A1* | 12/2003 | Pechatnikov ......... | G01C 21/26 701/411 |
| 2007/0204218 A1* | 8/2007 | Weber .................... | G01C 21/20 715/234 |
| 2012/0202525 A1 | 8/2012 | Pettini | |
| 2013/0239019 A1 | 9/2013 | Pike et al. | |

(Continued)

OTHER PUBLICATIONS

Title _ Definition of Title by Merriam-Webster.pdf (https://www.merriam-webster.com/dictionary/title, Title | Definition of Title by Merriam-Webster, Jul. 19, 2018, pp. 1-16).*

*Primary Examiner* — Bao Long T Nguyen
(74) *Attorney, Agent, or Firm* — Jefferson IP Law, LLP

(57) ABSTRACT

An electronic device is provided. The electronic device includes a processor configured to receive an input for executing an application that provides a map service, sense a selection input event associated with a creation image item of a map of interest provided in the application, receive an inputting of title information of the map of interest, allowed regional scope information, and access right information that allows access to the map of interest, generate map-of-interest data based on the received input, and control a display module to display a map-of-interest user interface (UI) based on the generated map-of-interest data, and a communication module configured to transmit the generated map-of-interest data to a server.

12 Claims, 10 Drawing Sheets

(56) References Cited

U.S. PATENT DOCUMENTS

| | | |
|---|---|---|
| 2014/0108066 A1 | 4/2014 | Lam et al. |
| 2015/0211881 A1* | 7/2015 | Stauber .............. G01C 21/3682 701/532 |
| 2016/0048298 A1* | 2/2016 | Choi ................... G06F 3/04842 715/846 |
| 2016/0210108 A1* | 7/2016 | Roytblat ................ G06F 17/00 |

* cited by examiner

METHOD OF SHARING INFORMATION THROUGH MAP SERVICE AND ELECTRONIC DEVICE THEREFOR

CROSS-REFERENCE TO RELATED APPLICATION(S)

This application claims the benefit under 35 U.S.C. § 119(a) of a Korean patent application filed on Sep. 5, 2014 in the Korean Intellectual Property Office and assigned Ser. No. 10-2014-0119240, the entire disclosure of which is hereby incorporated by reference.

TECHNICAL FIELD

The present disclosure relates to a method of sharing information through a map service and an electronic device that provides the same. More particularly, the present disclosure relates to a method of generating a map by sharing location information or place information with another electronic device.

BACKGROUND

As technologies have developed, when a user inputs a point of departure and a destination through a web service in order to get a desired destination, the user may be provided with an optimal route calculated from the web service. Also, when the user is provided with a service using a navigation terminal to get to a desired destination, the user may be provided with map information, traffic information, or the like, from the present location to the destination through a global positioning system (GPS) module, a location-based server, or the like that works together with the navigation terminal.

A web service provider that provides a map service, a server provider that works together with a navigation terminal, or the like, may provide a user with a map service based on an electronic map. For example, producers who provide services may display predetermined locations, such as major facilities, schools, terminals, hotels, or the like, on a map, as coordinates or images, and may provide the same to a user.

The above information is presented as background information only to assist with an understanding of the present disclosure. No determination has been made, and no assertion is made, as to whether any of the above might be applicable as prior art with regard to the present disclosure.

SUMMARY

When the user of an electronic device desires to report information, which is associated with a predetermined place, to a user of another electronic device, the user of the electronic device may report the information associated with the predetermined place without classification based on a subject, a location, or the like. This may cause an inconvenience to users, and the user of the electronic device should separately report the predetermined place through a short text message service, or the like, to a user of another electronic device, which is burdensome.

When a user of an electronic device desires to search for a desired place in a predetermined region, the user should search for the place using a web service or ask a user of another electronic device about the desired place. This may cause the user to unnecessarily expend time, and may deteriorate the accessibility and reliability associated with the information of the user.

Aspects of the present disclosure are to address at least the above-mentioned problems and/or disadvantages and to provide at least the advantages described below. Accordingly, an aspect of the present disclosure is to provide a method of generating a map, which overcomes the above described drawbacks, and an electronic device and a service which provide the method.

In accordance with an aspect of the present disclosure, a method of generating a map, an electronic device, and a server thereof are provided. The method includes receiving an input for executing an application that provides a map service, sensing a selection input event associated with a creation image item of a map of interest provided in the application, receiving an input associated with title information of the map of interest, allowed regional scope information, and access right information that allows access to the map of interest, generating map-of-interest data based on the received input, controlling a display module to display a map-of-interest user interface (UI) based on the generated map-of-interest data, and transmitting, by a communication module, the generated map-of-interest data to a server.

In accordance with another aspect of the present disclosure, a method of generating a map, and an electronic device and a server thereof are provided. The method includes receiving an input for executing an application that provides a map service, sensing a selection input event associated with a creation image item of a map of interest provided in the application, receiving an input associated with title information of the map of interest, allowed regional scope information, and access right information that allows the map of interest, generating map-of-interest data based on the received input, controlling a display module to display a map-of-interest UI based on the generated map-of-interest data, transmitting, by a communication module, the generated map-of-interest data to a server, and when the processor senses a selection input event associated with an addition image item which updates the map-of-interest data provided in the application, activating a camera module or establishing a connection to a location-based social network service through the communication module.

In accordance with another aspect of the present disclosure, a method of generating a map, and an electronic device and a server thereof are provided. The method includes receiving an input for executing an application that provides a map service, sensing a selection input event associated with a creation image item of a map of interest provided in the application, receiving an input associated with title information of the map of interest, allowed regional scope information, and access right information that allows the map of interest, generating map-of-interest data based on the received input, controlling a display module to display a map-of-interest UI based on the generated map-of-interest data, transmitting, by a communication module, the generated map-of-interest data to a server, when an input event associated with a recommended user image item is sensed, which selects another electronic device that is capable of changing the generated map-of-interest data, determining the other electronic device based on at least one piece of information from among: access frequency information associated with a category that is set in the generated map-of-interest data, location information of other electronic devices located within a predetermined critical distance from location information included in the generated map-of-interest data, keyword information included in the generated map-of-interest data, information associated with the number of times that map-of-interest data is generated, information associated with the number of times that the generated map-of-interest data is updated, and access frequency information associated with the generated map-of-interest data, and controlling the display module to display an image item corresponding to the determined other electronic device.

According to various embodiments of the present disclosure, an electronic device sets an allowed regional scope and an access right when generating a map, so that the electronic device may receive regional information desired by the user of the electronic device and information updated by a user of another electronic device. This satisfies the needs of a user who generates a map and improves utilization and convenience.

According to various embodiments of the present disclosure, an electronic device sets the standards for other electronic devices that generate a map together, so as to increase satisfaction and reliability associated with the generation of map-of-interest data of a user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
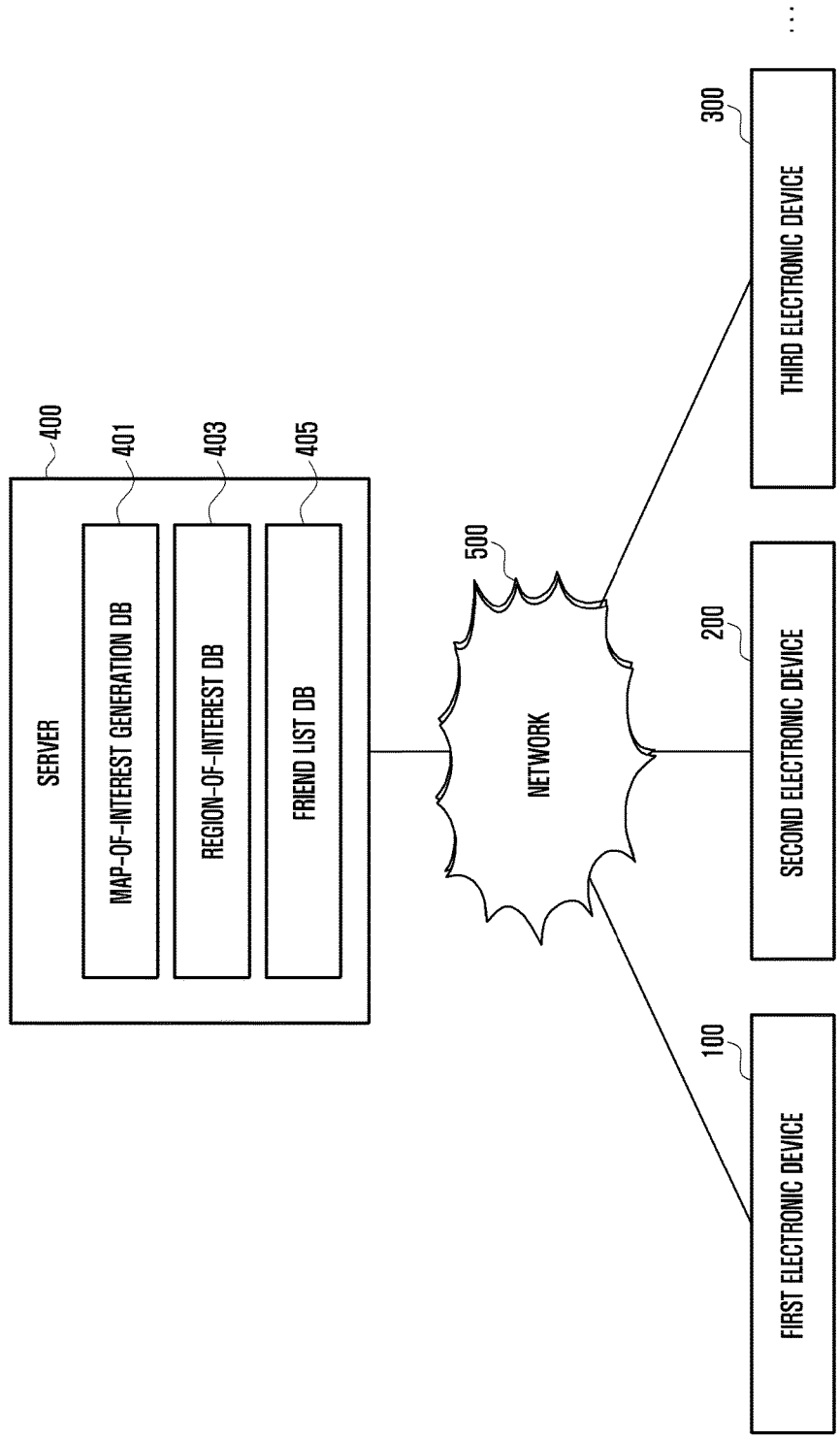
FIG. 1 is a diagram schematically illustrating connections between electronic devices and a server over a network according to various embodiments of the present disclosure.

FIG. 1 is a diagram schematically illustrating connections between electronic devices and a server over a network according to various embodiments of the present disclosure.

Referring to FIG. 1, the electronic devices 100, 200, and 300 are connected to the server 400 over the network 500. Here, the electronic devices 100, 200, and 300 are distinguished by names, that is, a first electronic device 100, a second electronic device 200, and a third electronic device 300, respectively. Here, for ease of description, the first electronic device 100 is referred to as the electronic device 100, and the second electronic device 200 and the third electronic device 300 are referred to as other electronic devices.

At least two electronic devices may be connected over the network 500, and the single electronic device 100 may be connected to the server 400 over the network 500. The types of electronic devices 100, 200, and 300 may or may not be identical. The electronic device 100, according to an embodiment of the present disclosure, may execute functions or operations identical to the other electronic devices 200 and 300.

The electronic device 100, according to an embodiment of the present disclosure, may receive an application from the server 400. The electronic device 100, according to an embodiment of the present disclosure, may receive an application installation file from the server 400, and may install the application by executing the installation file. The electronic device 100, according to an embodiment of the present disclosure, may be registered on the server 400 by executing the installed application and inputting identification (ID) information, password information, or the like of the electronic device 100.

The electronic device 100, according to an embodiment of the present disclosure, may receive an application that provides a map service from the server 400, and may install the application. The electronic device 100 may register the electronic device 100 on the server 400 by inputting ID information, password information, or the like in the executed application, and by transmitting the same to the server 400.

The electronic device 100, according to an embodiment of the present disclosure, may generate map-of-interest data using the application that provides a map service. The electronic device 100, according to an embodiment of the present disclosure, may transmit the generated map-of-interest data to the server 400.

The electronic device 100, according to an embodiment of the present disclosure, may receive an input for adding or changing at least one piece of information from among location information and place information in the application that provides a map service. The electronic device 100, according to an embodiment of the present disclosure, may transmit, to the server 400, a request signal that requests the changing of at least one piece of information from among location information and place information corresponding to the received input.

The electronic device 100, according to an embodiment of the present disclosure, may receive a notification signal from the server 400 as the map-of-interest data is updated by the other electronic devices 200 and 300. For example, the other electronic devices 200 and 300 may add predetermined place information, predetermined location information, or the like in the application that provides a map service. Whether to receive the notification signal associated with the added place information, may be set in advance by the electronic device 100 (for example, using a sharing service with the other electronic devices 200 and 300, using a subscription service, or the like may be set) or may be determined based on the standards (for example, an access right, allowed regional scope information, or the like) stored in the server 400.

The server 400 may support driving of the electronic devices 100, 200, and 300 by performing at least one operation (or function) implemented in the electronic devices 100, 200, and 300. The server 400, according to embodiments of the present disclosure, may be referred to as a host device, a location-based service device, and the like.

When the electronic devices 100, 200, and 300 should execute a function or a service automatically or in response to a request, the server 400, according to an embodiment of the present disclosure, may execute a part of the function or the service that should be performed for the electronic devices 100, 200, and 300. For example, the server 400 may use cloud computing, distributed computing, or client-server computing technology with the electronic devices 100, 200, and 300.

The server 400, according to an embodiment of the present disclosure, may include a map-of-interest generation database (DB) 401, a region-of-interest DB 403, and a friend list DB 405. The map-of-interest generation DB 401 may be a DB that stores map-of-interest data generated by any of the electronic devices 100, 200, and 300. The region-of-interest DB 403 may be a DB that stores allowed regional scopes set in the generated map-of interest data. For example, each piece of map-of-interest data may be data that is associated with an allowed regional scope (for example, a predetermined city, a predetermined nation, and the like) set by each of the electronic devices 100, 200, and 300.

The friend list DB 405 may be a DB that stores information associated with the use of a friend service set by each of the electronic devices 100, 200, and 300. Here, the friend service refers to one of the services of the application that provides a map service, which provides an access right for the map-of-interest data generated by each of the electronic devices 100, 200, and 300. For example, when the electronic device 100 transmits a request signal for using the friend service with the electronic device 200, and the electronic device 200 grants permission, the electronic device 100 and the electronic device 200 may use the friend service.

The server 400, according to an embodiment of the present disclosure, may receive, from the electronic device 100, the map-of-interest data generated using a map service in the application. The server 400 may store the received map-of-interest data in the map-of-interest generation DB 401.

The server 400, according to an embodiment of the present disclosure, may determine friend list information of the electronic device 100, who has access right information that allows access to the map-of-interest data of the electronic device 100, through the friend list DB 405. Here, the friend list information may be set in advance by the electronic device 100.

The server 400, according to an embodiment of the present disclosure, may determine an electronic device to which the map-of-interest data is to be transmitted, based on the determined friend list information. For example, when the other electronic devices 200 and 300 exist in the friend list of the electronic device 100, the server 400 may transmit the map-of-interest data to the other electronic devices 200 and 300. Additionally, for example, the other electronic devices 200 and 300 are registered on the server 400 that provides the application, and ID information, password information, and the like may be stored.

The server 400, according to an embodiment of the present disclosure, may receive, from the electronic device 100, a signal that requests adding or changing at least one piece of information from among location information and place information associated with the map-of-interest data provided in the application. The server 400, according to an embodiment of the present disclosure, may determine map-of-interest data to be updated from among multiple pieces of map-of-interest data stored in advance in the server 400, based on whether the at least one piece of information from among the location information and the place information satisfies allowed regional scope information set in advance. For example, in the case where the server 400 receives the addition of place information associated with a store located in Dogok-dong, Gangnam-Gu, Seoul, when an allowed regional scope of map-of-interest data stored in the server 400 is Busan, it is determined that the received place information exceeds the allowed regional scope and the information may be excluded from the map-of-interest data that is to be updated.

The server 400, according to an embodiment of the present disclosure, may determine other electronic devices that are to receive the at least one piece of information from among the location information and the place information, which is updated by the electronic device 100, based on predetermined standards (for example, access right information, whether the electronic devices included in the friend list, whether the electronic device uses a subscription service, or the like). For example, the server 400 may determine other electronic devices to which information updated by the electronic device 100 is to be transmitted.

According to an embodiment of the present disclosure, the network 500 may be a telecommunication network. The telecommunication network may include at least one of a computer network, the Internet, Internet of things, and a telephone network.

Figure 2:
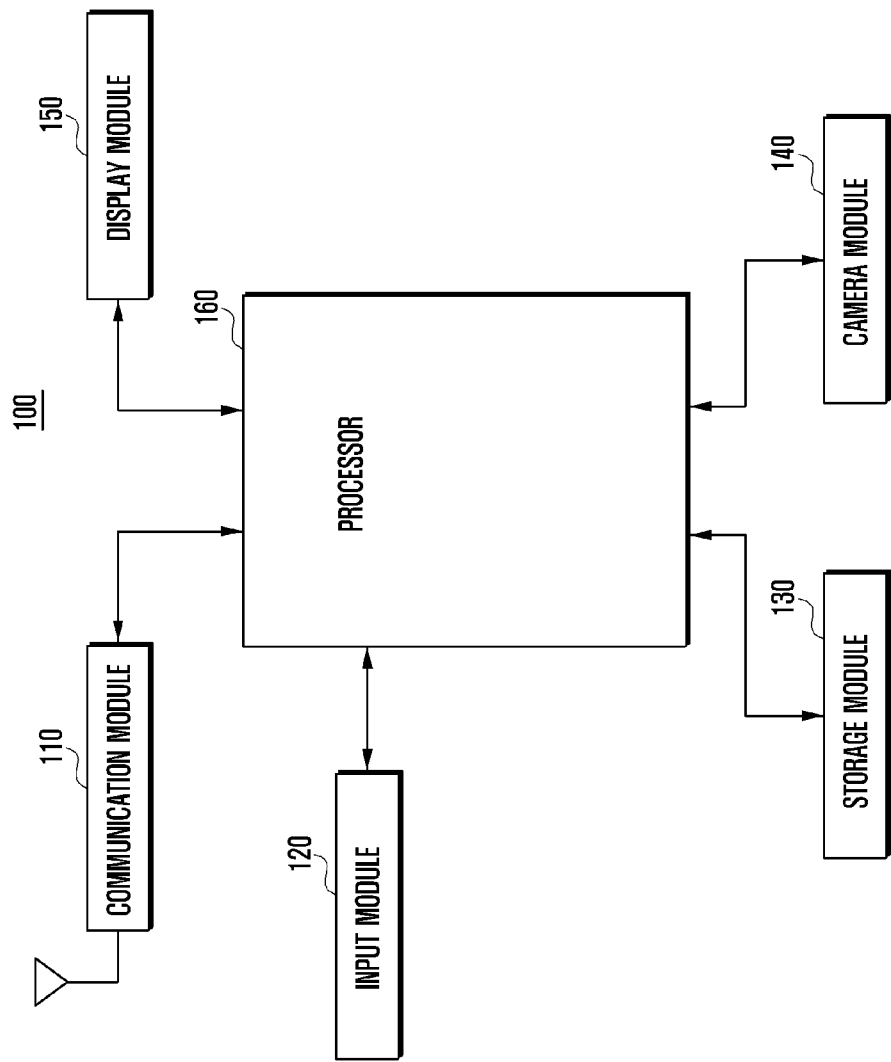
FIG. 2 is a block diagram schematically illustrating a configuration of an electronic device according to various embodiments of the present disclosure.

FIG. 2 is a block diagram schematically illustrating a configuration of an electronic device, such as the electronic device 100 of FIG. 1, according to various embodiments of the present disclosure.

Referring to FIG. 2, the electronic device 100, according to an embodiment of the present disclosure, may be a device that is capable of executing a communication function. For example, the electronic device 100 may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device (for example, head-mounted-device (HMD) such as electronic glasses, electronic clothes, an electronic bracelet, an electronic necklace, an electronic appcessory, an electronic tattoo, or a smart watch).

The electronic device 100 may include a communication module 110, an input module 120, a storage module 130, a camera module 140, a display module 150, and a processor 160.

The communication module 110 is a communication module for supporting a mobile communication service of the electronic device 100. The communication module 110 may establish a communication channel with a mobile communication system. To this end, the communication unit 110 may include a radio frequency transmitter for up-converting and amplifying the frequency of a transmitted signal and a receiver for low-noise amplifying a received signal and down-converting the frequency thereof.

The input module 120 may include a plurality of input keys and function keys for receiving inputs of number or character information and for setting various functions. The function keys may include a direction key, a side key, and a shortcut key, which are set to execute particular functions. Also, the input module 120 may generate a key signal associated with user settings and controlling a function of the electronic device 100, and may transfer the same to the processor 160.

The storage module 130 may store an application program required for a functional operation, an application program for reproducing various stored files, and a key map, a menu map, or the like for operating the display module 150. Here, the key map and the menu map may have various forms.

For example, the key map may be a keyboard map, a 3*4 key map, a QWERTY key map, or a control key map for controlling an operation of the currently activated application program. The menu map may be a control key map for controlling an operation of the currently activated application program. In addition, the menu map may also be a menu map for controlling an operation of the currently activated application program or a menu map having various menus, provided by the electronic device terminal 100 as items thereof. The storage module 130 may roughly include a program area and a data area.

The program area may store an operating system (OS) for booting the electronic device 100 and for operating the above described components, and an application program for reproducing various files, for example, an application program for supporting a call function based on whether the electronic device 100 supports a function, a web browser for accessing an interne server, an MP3 application program for reproducing various sound sources, an image output application program for reproducing a picture or the like, a video playback application program, and the like.

The data area is an area where data generated as the electronic device 100 is used is stored, and may store at least one icon associated with phone book information, a widget function, and various contents. Also, the data area may store a user input that is input through the display module 150 when the display module 150 is provided.

The camera module 140 may be a device that is capable of photographing a still image and a video. The camera module 140, according to an embodiment of the present disclosure, may include one or more image sensors (for example, a front sensor or a back sensor), a lens, an image signal processor (ISP), or a flash (for example, a light emitting diode (LED) or a xenon lamp).

The display unit 150 may display information input by a user or information to be provided to the user as well as various menus of the electronic device 100. That is, the display module 150 may provide various screens associated with the use of the electronic device 100, for example, a waiting screen, a menu screen, a message writing screen, a calling screen, and the like. The display module 150 may be formed of a liquid crystal display (LCD), an organic LED (OLED), or the like, and may be included in an input means. The electronic device 100 may provide various menu screens for various menus that may be executed based on the display module 150, according to the support of the display module 150.

The display module 150 may be provided in the form of a touch screen by being integrated with a touch panel. For example, the touch screen may be formed as an integral module in which a display panel and a touch panel are coupled to each other in a stack structure. The touch panel may recognize a user's touch input based on at least one of, for example, a capacitive type, a resistive type, an infrared type, and an acoustic wave type. The touch panel may further include a controller (not illustrated). In the case of a capacitive type, proximity recognition is possible in addition to the recognition of a direct touch. The touch panel may further include a tactile layer. In this case, the touch panel may provide a user with a tactile reaction.

The display module 150, according to an embodiment of the present disclosure, may display a map-of-interest user interface (UI) that provides a map service. The display module 150, according to an embodiment of the present disclosure, may display an image item corresponding to a notification signal, generated as map-of-interest data, which is updated by the other electronic devices 200 and 300. The display module 150, according to an embodiment of the present disclosure, may display an image item corresponding to the map-of-interest data of the other electronic devices 200 and 300.

The display module 150, according to an embodiment of the present disclosure, may sense a touch input event that requests executing a function of the electronic device 100. The display module 150 may transfer information corresponding to the sensed touch input event to the processor 160.

The processor 160 may support execution of an initialization process by controlling the power supply to the components of the host device 100 and may control the components when the initialization process is completed.

The processor 160, according to an embodiment of the present disclosure, may receive, from the server 400, an application that provides a map service through the communication module 110. The processor 160 may install the application as the processor 160 senses an installation input event associated with the received application. Here, the application that provides a map service may be a database that stores a world map data DB, a satellite map DB, a three-dimensional (3D) location DB, and the like. For example, the application that provides a map service may be continuously updated in association with geographic feature data (for example, stores, schools, hotels, and the like), data associated with the names of objects (for example, a name of a city, a name of a road, or the like), and the like.

The processor 160, according to an embodiment of the present disclosure, may receive an input for executing an application that provides a map service. For example, the processor 160 may receive an input for executing the application as it receives a touch input event through the display module 150.

The processor 160, according to an embodiment of the present disclosure, may sense a selection input event associated with a creation image item of a map of interest provided in the application. Here, the creation image item of a map of interest may be a thumbnail image, a shortcut icon, or the like.

The processor 160, according to an embodiment of the present disclosure, may receive an input associated with the title information of a map of interest, allowed regional scope information, and access right information that allows access to a map of interest. The processor 160, according to an embodiment of the present disclosure, may receive an input associated with at least one piece of information from among title information of a map of interest, allowed regional scope information, and access right information that allows access to a map of interest. The processor 160, according to an embodiment of the present disclosure, may generate map-of-interest data based on the received input.

The allowed regional scope information of a map of interest, according to an embodiment of the present disclosure, may be critical regional information that is input by the user of the electronic device 100. For example, the user of the electronic device 100 may set a 'predetermined city' or a 'predetermined nation' when setting the allowed regional scope. Additionally, for example, when the user of the electronic device 100 generates map-of-interest data based on the 'predetermined city', a city that is outside the 'predetermined city' may not be added to the generated map-of-interest data.

The access right information that allows access to a map of interest, according to an embodiment of the present disclosure, may be critical information associated with the access to the map-of-interest data generated by the user of the electronic device 100. For example, the user of the electronic device 100 may set access right information by classifying the access right information as "public", "friends", "only me", and the like.

For example, when the user of the electronic device 100 sets the access right for accessing information-of-interest data as "public," all the users that subscribe to the application may search for, subscribe to, or update the map-of-interest data generated by the electronic device 100. When the user of the electronic device 100 sets the access right for accessing information-of-interest data as "friends," only the users of the other electronic devices 200 and 300 that are determined to use a friend service with the electronic device 100 from among the users who subscribe to the application, may search for, subscribe to, or update the map-of-interest data generated by the electronic device 100.

When the user of the electronic device 100 sets the access right for accessing data of information-of-interest data as "only me," only the user of the electronic device 100 may search for, subscribe to, or update the map-of-interest data generated by the electronic device 100. The electronic device 100, according to an embodiment of the present disclosure, may assign access right information to only the users of predetermined other electronic devices, and may change and update the set access right information or the like.

Here, the friend service may be one of the services provided in the application that provides a map service. While the user of the electronic device 100, according to an embodiment of the present disclosure, uses the friend service, when information-of-interest data is updated (for example, adding or changing location information or place information, or the like) in the electronic device 100, the server 400 may transmit the updated information-of-interest data to another electronic device that uses the friend service with the electronic device 100.

The processor 160, according to an embodiment of the present disclosure, may control the display module 150 to display a map-of-interest UI based on the map-of-interest data.

The processor 160, according to an embodiment of the present disclosure, may activate the camera module 140 when a selection input event associated with an addition image item is sensed, which updates the map-of-interest data provided in the application.

When the processor 160, according to an embodiment of the present disclosure, activates the camera module in response to sensing the selection input event associated with the addition image item, the processor 160 may receive an input of at least one piece of information from among location information, place information, and image information input through the camera module 140. For example, the processor 160 may sense an input event associated with the location information and the place information through the display module 150.

The location information and the place information, according to an embodiment of the present disclosure, may determine the current location information of the electronic device 100 through a global positioning system (GPS) module (not illustrated). For example, the processor 160 may receive the location information and the place information of the electronic device 100 through a GPS module (not illustrated), and the processor 160 may execute a control so as to automatically input the received location information and place information. Image information input through the camera module 140 may be generated by capturing an image.

The processor 160, according to an embodiment of the present disclosure, may control the communication module 110 to transmit, to the server 400, data generated based on the received input. For example, the processor 160 may control the communication module 110 to transmit, to the server 400, data generated as the processor 160 senses an input associated with location information, place information, and image information.

When a connection to a location-based social network service is established through the communication module 110, the processor 160, according to an embodiment of the present disclosure, may control the communication module 110 to communicate with the server 400 in association with at least one piece of information from among location information and place information, which is retrieved through the location-based social network service. Here, the location-based social network service may provide a service for sharing location information, place information, and the like, among a plurality of users. When the processor 160, according to an embodiment of the present disclosure, desires to use a location-based social network service, the processor 160 may transmit a request signal for working together with the location-based social network service, and may work together with the location-based social network service by receiving a response to the request signal.

The processor 160, according to an embodiment of the present disclosure, may receive, through the communication module 110 from the server 400, a notification signal, which is generated as the generated map-of-interest data, is updated by another electronic device. For example, the other electronic devices 200 and 300 may set an electronic device, which is to receive a notification signal when the map-of-interest data is updated. When the electronic device 100 is set (for example, allowing an access right, using a friend service, or the like) as an electronic device that is to receive a notification signal from the other electronic devices 200 and 300, the electronic device 100 may receive the notification signal. The processor 160, according to an embodiment of the present disclosure, may control the display module 150 to display an image item corresponding to the notification signal, based on the received notification signal. For example, the image item corresponding to the notification signal may be a thumbnail image.

The processor 160, according to an embodiment of the present disclosure, may sense an input event associated with a recommended user image item, which selects another electronic device that is capable of changing the generated map-of-interest data.

When an input event associated with the recommended user image item is sensed, the processor 160, according to an embodiment of the present disclosure, may determine another electronic device based on access frequency information associated with a category set in the generated map-of-interest data. The category may indicate classifications set in the map-of-interest data (for example, restaurants, schools, hotels, and the like). For example, the processor 160 may extract other electronic devices that frequently search for an Italian restaurant by working together with the server 400 when place information included in the map-of-interest data is classified as an Italian restaurant.

The processor 160, according to an embodiment of the present disclosure, may determine another electronic device based on location information of other electronic devices located within a predetermined critical distance from the location information included in the generated map-of-interest data. For example, the server 400 may determine another electronic device located within a predetermined critical distance (for example, 5 km, 10 km, and the like) from an allowed regional scope included in the map-of-interest data. The server 400 may transmit, to the electronic device 100, information associated with the determined other electronic device.

The processor 160, according to an embodiment of the present disclosure, may determine another electronic device based on keyword information included in the generated map-of-interest data. For example, the processor 160 may determine map-of-interest data of the other electronic devices 200 and 300 including keyword information (for example, a baby, a festival, a restaurant, or the like) included in the map-of-interest data, by working together with the server 400. Based on the determined map-of-interest data, the processor 160 may extract another electronic device by working together with the server 400. Additionally, for example, the processor 160 may extract other electronic devices that search for the keyword information included in the generated map-of-interest data.

The processor 160, according to an embodiment of the present disclosure, may determine another electronic device based on information associated with the number of times that map-of-interest data is generated. For example, the processor 160 may determine the number of times that map-of-interest data is generated, which is generated by other electronic devices 200 and 300, by working together with the server 400. The processor 160 may extract other electronic devices based on the determined number of times that generation occurs.

The processor 160, according to an embodiment of the present disclosure, may determine another electronic device based on information associated with the number of times that map-of-interest data is updated. The processor 160, according to an embodiment of the present disclosure, may determine another electronic device based on access frequency information associated with the generated map-of-interest data.

The processor 160, according to an embodiment of the present disclosure, may control the display module 150 to display an image item corresponding to the determined other electronic device. The display module 150, according to an embodiment of the present disclosure, may display an image item (for example, an ID item, a name item, and the like) corresponding to the other electronic device in the form of a list.

The processor 160, according to an embodiment of the present disclosure, may search for generated map-of-interest data based on at least one piece of information from among location information, subject information, keyword information, a generator name information (for example, ID information) and name information (for example, ID information) of another electronic device that updates map-of-interest data. For example, the processor 160 may receive an input for searching for predetermined information (for example, place information, keyword information, and the like) from among multiple pieces of map-of-interest data stored in the server 400, by working together with the server 400. The processor 160 may extract information corresponding to the received input from the server 400, based on the received input.

Figure 3:
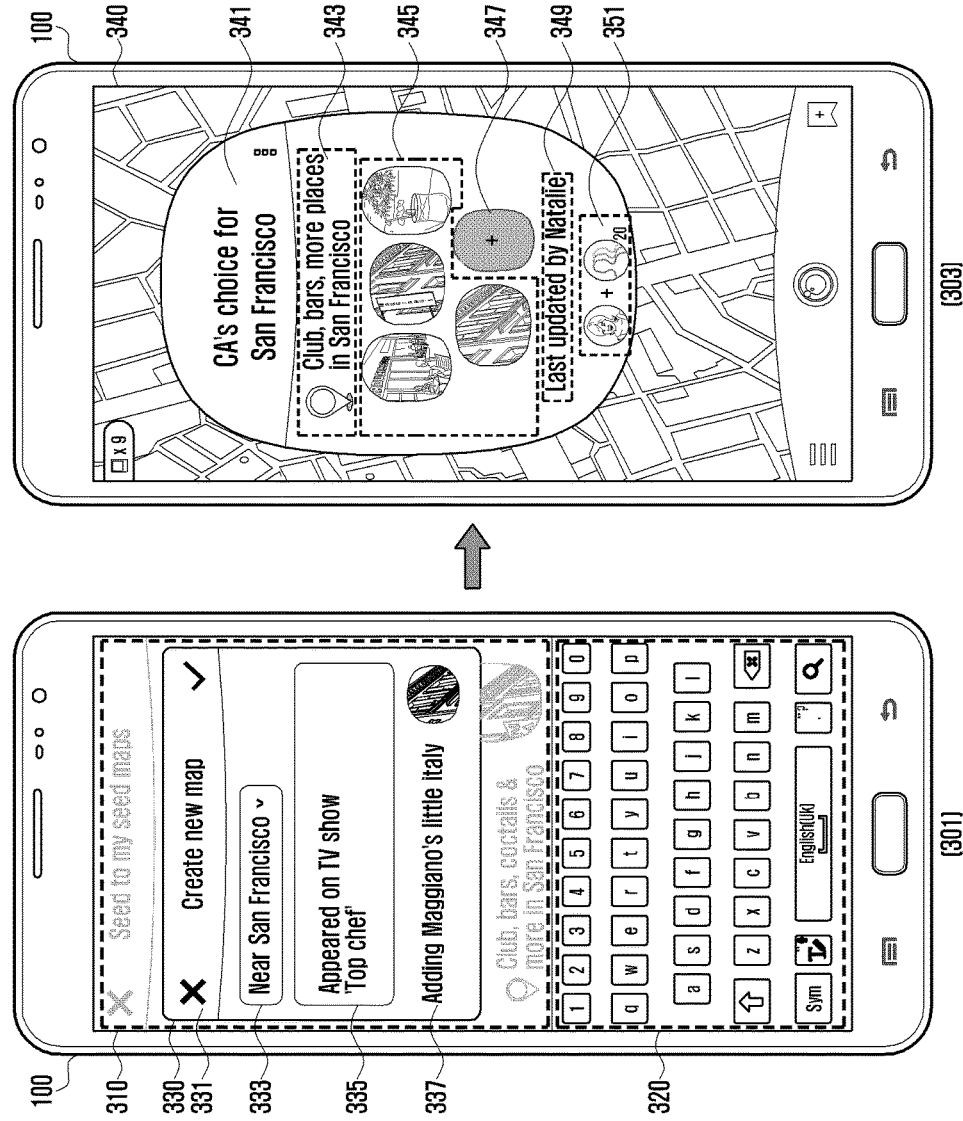
FIG. 3 is a diagram illustrating a user interface (UI) screen of an electronic device, which is associated with generating a map, according to various embodiments of the present disclosure.

FIG. 3 is a diagram illustrating a UI screen of an electronic device, such as the electronic device 100 of FIG. 1, which is associated with generating a map, according to various embodiments of the present disclosure.

Referring to FIG. 3, the electronic device 100 may display a UI screen for generating a map in an application that provides a map service.

As illustrated in diagram 301, the electronic device 100 may display a map application 310 and a keypad UI screen 320. When sensing a selection input event associated with a creation image item of a map of interest provided in the application, the electronic device 100 may display a map-of-interest creation image item 330. The map-of-interest creation image item 330 may include a title item 331, an allowed regional scope information item 333, a title setting item 335, and a place item 337.

Here, the title item 331 may display title information associated with a map-of-interest creation image item. For example, the title item 331 may be displayed as "Create new map."

The allowed regional scope information item 333, according to an embodiment of the present disclosure, may be an item for selecting information associated with a critical regional scope, desired by a user of the electronic device 100, from all the regions of the world. For example, the user of the electronic device 100 may select a predetermined city, a nation, a state, a street address, a road name address, a building address, and the like.

The user of the electronic device 100, according to an embodiment of the present disclosure, may select a city name of "San Francisco" through the allowed regional scope information item 333, and may generate map-of-interest data. For example, when location data, place data, and the like included in a city such as "LA," "Seoul," "Suwon," or the like, is changed by the other electronic devices 200 and 300, the map-of-interest data generated by the electronic device 100 may not be changed. Additionally, for example, when place data or the like included in the city of "San Francisco" is added or changed, the map-of-interest data generated by the electronic device 100 or the other electronic devices 200 and 300 may be updated.

The title setting item 335, according to an embodiment of the present disclosure, may be an image item associated with the title information of the map-of-interest data. For example, the user of the electronic device 100 may input "Appeared on TV show top chef" in the title setting item 335, as a title of a predetermined place in the city of "San Francisco."

The place item 337, according to an embodiment of the present disclosure, may be an image item for inputting comments or the like associated with a predetermined place of "San Francisco" (for example, Maggiano restaurant or the like). For example, the user of the electronic device 100 may input comments of "Adding Maggiano's little Italy" and a thumbnail image, through the place item 337. Inputting through the place item 337, according to an embodiment of the present disclosure, may be omitted when map-of-interest data is generated.

The electronic device 100, according to an embodiment of the present disclosure, may receive an input associated with access right information that allows access to a generated map of interest. The electronic device 100, according to an embodiment of the present disclosure, may classify the access to the generated map of interest, as "public", "friends", "only me" or the like.

Here, when the access right corresponds to "public," it indicates that access to the map of interest generated by the electronic device 100 is given to all of the subscribers who subscribe to the application. Here, when the access right corresponds to "friends," it indicates that the access to the map of interest is allowed to only other electronic devices that register to use a friend service with the electronic device 100. Here, when the access right corresponds to "only me," it indicates that the access to the map of interest is given to only the electronic device 100 that generates the map-of-interest data.

As illustrated in diagram 303, the electronic device 100 may display a map creation item 340. The map creation item 340 may include a title item 341, a place item 343, a thumbnail image item 345, an addition item 347, a recent update user item 349, and an updating participant item 351.

The title item 341 may be displayed based on ID information, title information, region information, and the like input by the user of the electronic device 100. For example, when the user ID of the electronic device 100 is "CA," and the allowed regional scope selected by the electronic device 100 is "San Francisco," the title item 341 may be displayed as "CA's choice for San Francisco."

The place item 343 may display a type of place information included in the generated map-of-interest data. For example, category information of multiple pieces of place information that is input or added by the electronic device 100, or other electronic devices may be displayed. For example, the category information may be displayed as "restaurant (for example, an Italian restaurant, a Chinese restaurant, or the like)," "school (for example, an elementary school, a middle school, a high school, or the like)," "club," "bar," or the like.

The thumbnail image item 345 may be an image captured through the camera module 140. The thumbnail image item 345, according to an embodiment of the present disclosure, may be an image item generated by downloading an image item corresponding to each place from an external server, or may be an image item corresponding to each category (for example, a school, a hotel, a club, or the like).

The addition item 347 is a thumbnail image for updating place information or the like. The electronic device 100 may display a separate screen for adding place information or location information when sensing a selection input event associated with the addition item 347.

The recent update user item 349 may be an image item for displaying a user (for example, an ID or the like) of an electronic device that updates generated map-of-interest data most recently. For example, the generated map-of-interest data may be updated by users of a plurality of electronic devices. Additionally, for example, when the map-of-interest data is updated by "Natalie" who is a user of an electronic device, the recent update user item 349 may be displayed as "Last updated by Natalie."

The updating participant item 351 may display an image item associated with a user of an electronic device that subscribes to map-of-interest data, a user of an electronic device that adds or changes location information or place information set in map-of-interest data, or the like. For example, the updating participant item 351 may display a thumbnail image of users of other electronic devices that share, add, or change generated map-of-interest data. For example, the updating participant item 351 may display an image item (for example, 20 persons, 30 persons, or the like) associated with the number of users who participate in updating, or the like, of map-of-interest data.

Figure 4:
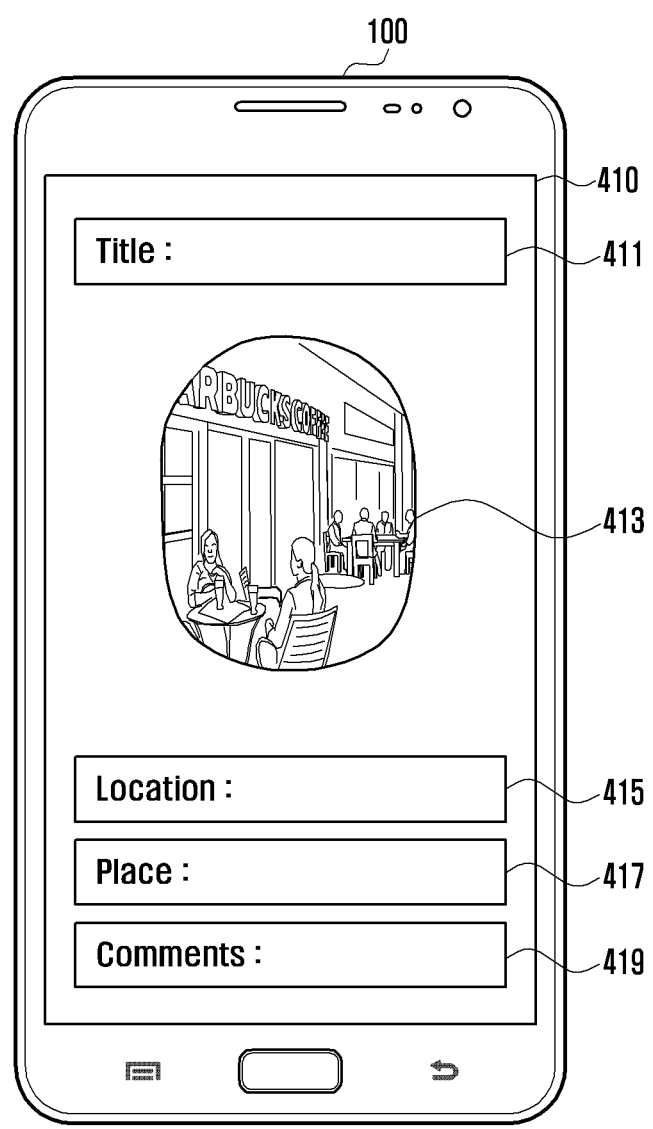
FIG. 4 is a diagram illustrating a UI screen of an electronic device, which is associated with adding location information and place information, according to various embodiments of the present disclosure.

FIG. 4 is a diagram illustrating a UI screen of an electronic device, which is associated with adding location information and place information, according to various embodiments of the present disclosure.

Referring to FIG. 4, when sensing a selection input event associated with an addition image item for updating map-of-interest data, the electronic device 100 may display a map-of-interest updating item 410. The map-of-interest updating item 410 may include a title item 411, a camera module item 413, a location item 415, a place item 417, and a comment item 419.

The title item 411 may be a thumbnail image for adding place information and location information. The camera module item 413 is an item for displaying an image screen activated through the camera module 140. The location item 415 may be an item for inputting location information added by the user of the electronic device 100. For example, the processor 160 may determine the current location of the electronic device 100 through a GPS module mounted in the electronic device 100, and may automatically input the determined current location of the electronic device 100.

The place item 417 may be an image item for displaying place information input by the electronic device 100. For example, an image item including information associated with schools, hotels, restaurants, or the like may be displayed.

The comments item 419 may be an image item for displaying text information input by the electronic device 100. For example, the text input by the user of the electronic device 100 may be input through the comment item 419.

Figure 5:
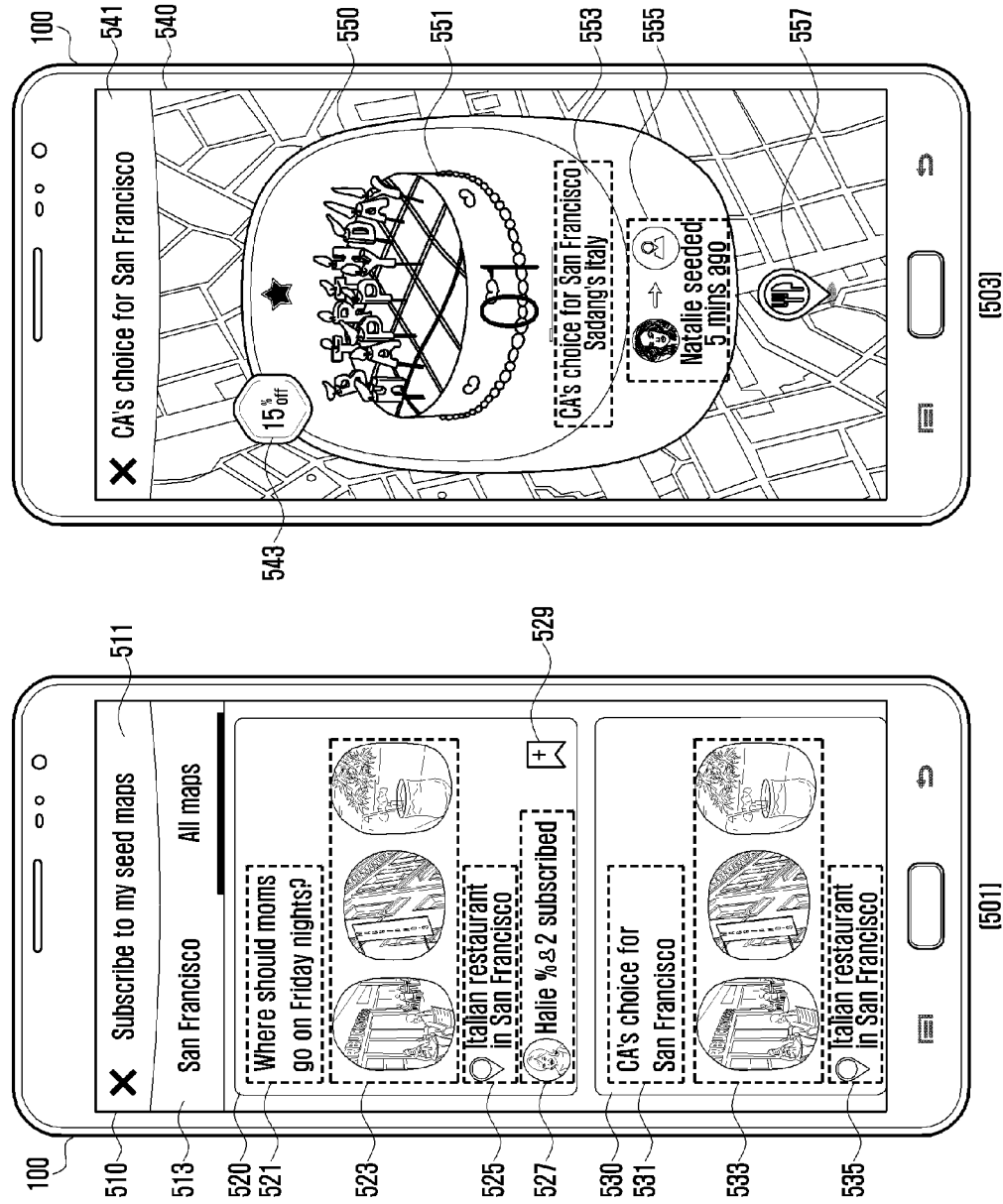
FIG. 5 is a diagram illustrating a UI screen of an electronic device, which is associated with subscribing to map-of-interest data of another electronic device, according to various embodiments of the present disclosure.

FIG. 5 is a diagram illustrating a UI screen of an electronic device, such as the electronic device 100 of FIG. 1, which is associated with subscribing to map-of-interest data of another electronic device, such as the electronic device 200 of FIG. 1, according to various embodiments of the present disclosure.

Referring to FIG. 5, the electronic device 100 may display map-of-interest UIs corresponding to the map-of-interest data generated by the electronic device 100 and the map-of-interest data generated by the other electronic device 200 through an application that provides a map service.

Referring to the diagram 501, the electronic device 100 may display a map-of-interest list UI 510. The map-of-interest list UI 510 may include a title UI 511, a selection UI 513, a first map-of-interest UI 520, and a second map-of-interest UI 530.

The title UI 511 may display text title information associated with the map-of-interest list UI 510. For example, the title UI 511 may be displayed as "Subscribe to seed map."

The selection UI 513 may be a UI that displays region information (for example, San Francisco) included in the map-of-interest data generated by the electronic device 100 and the map-of-interest data generated by the other electronic device 200. For example, the display module 150 may display the information associated with the map-of-interest data generated by the electronic device 100 when a map (for example, San Francisco) generated by the electronic device 100 is selected. Additionally, for example, the display module 150 may display all the map-of-interest data generated by the electronic device 100 and other electronic devices 200 and 300 when a tap (for example, all maps) that shows the map-of-interest data, which is generated by the other electronic devices 200 and 300, and for which the electronic device 100 has an access right, is selected.

The first map-of-interest UI 520 may include a title item 521, a thumbnail image item 523, a location item 525, an interwork user item 527, and a subscription item 529.

The title item 521 may be an image item for displaying a title generated by the other electronic device 200 that generates map-of-interest data corresponding to the first map-of-interest UI 520. For example, the other electronic device 200 may input and store title information of "Where should moms go on Friday nights?"

The thumbnail image item 523 may be an image item associated with place information included in the map-of-interest data generated by the other electronic device 200. For example, the other electronic device 200 may capture a predetermined place through a camera or the like. The thumbnail image item 523 may be an image item for displaying a captured predetermined place.

When an input event associated with the thumbnail image item 523, according to an embodiment of the present disclosure, is sensed, place information, phone number information, business hour information, and the like corresponding to the thumbnail image item 523 may be displayed. Comments associated with the thumbnail image item 523, according to an embodiment of the present disclosure, may be input, and comments between the electronic device 100 and the other electronic devices 200 and 300 may be shared.

The location item 525 may be an image item for displaying information associated with an allowed regional scope generated by another electronic device, a category of a place, and the like. For example, the location item 525 may be an image item for displaying text information of "Italian restaurant in San Francisco" that is classified as a predetermined category of a predetermined city.

The interwork user item 527 may be an image item for displaying information associated with a user who subscribes to displayed map-of-interest data, a user who uses a friend service, or the like.

The subscription item 529 may be an image item corresponding to a subscriber service through which information associated with a change of map-of-interest data is received, even though the electronic device 100 and the other electronic device 200 do not use a friend service. For example, when the electronic device 100 does not use a friend service with the other electronic device 200, but uses a subscription service, the electronic device 100 may receive a notification signal associated with updating when map-of-interest data generated by the other electronic device 200 is updated. The subscription service may be one of the services of the application that provides a map service.

The second map-of-interest UI 530 may include a title item 541. The title item 541 may be an image item for displaying a title generated by another electronic device (the electronic device 300) that generates map-of-interest data corresponding to the first map-of-interest UI 530. For example, the other electronic device 300 may input and store title information of "CA's choice for San Francisco."

The thumbnail image item 533 may be an image item associated with place information included in the map-of-interest data generated by the other electronic device 300. For example, the other electronic device 300 may capture a predetermined place through a camera or the like. The thumbnail image item 523 may display a captured predetermined place.

The location item 535 may be an image item for displaying information associated with an allowed regional scope generated by another electronic device, a category of a place, and the like. For example, the location item 525 may display text information of "Italian restaurant in San Francisco" that is classified as a predetermined category of a predetermined city.

Referring to the diagram 503, the electronic device 100 may display data associated with updated place information on a screen of the electronic device 100, when predetermined map-of-interest data is updated.

The update UI screen 540 may display a map screen provided in map-of-interest data through the display module 150. The display module 150 may display an image item corresponding to updated place information on a corresponding map screen through a place thumbnail image 557.

The place UI screen 550 may include a thumbnail image item 551, a region item 553, and a user item 555. The thumbnail image item 551 may be an image item of an image captured by the electronic device 100 or other electronic devices 200 and 300. The region item 553 may be an image item for displaying allowed region scope information of map-of-interest data, title information of map-of-interest data, or the like. The user item 555 may be an image item for displaying name information, ID information, update time information, and the like of an electronic device that updates location information or place information.

The update UI screen 540, according to an embodiment of the present disclosure, may additionally include a discount item 543 corresponding to current discount information associated with updated place information. Here, the discount information may be received from the server 400 and may be automatically added.

Figure 6:
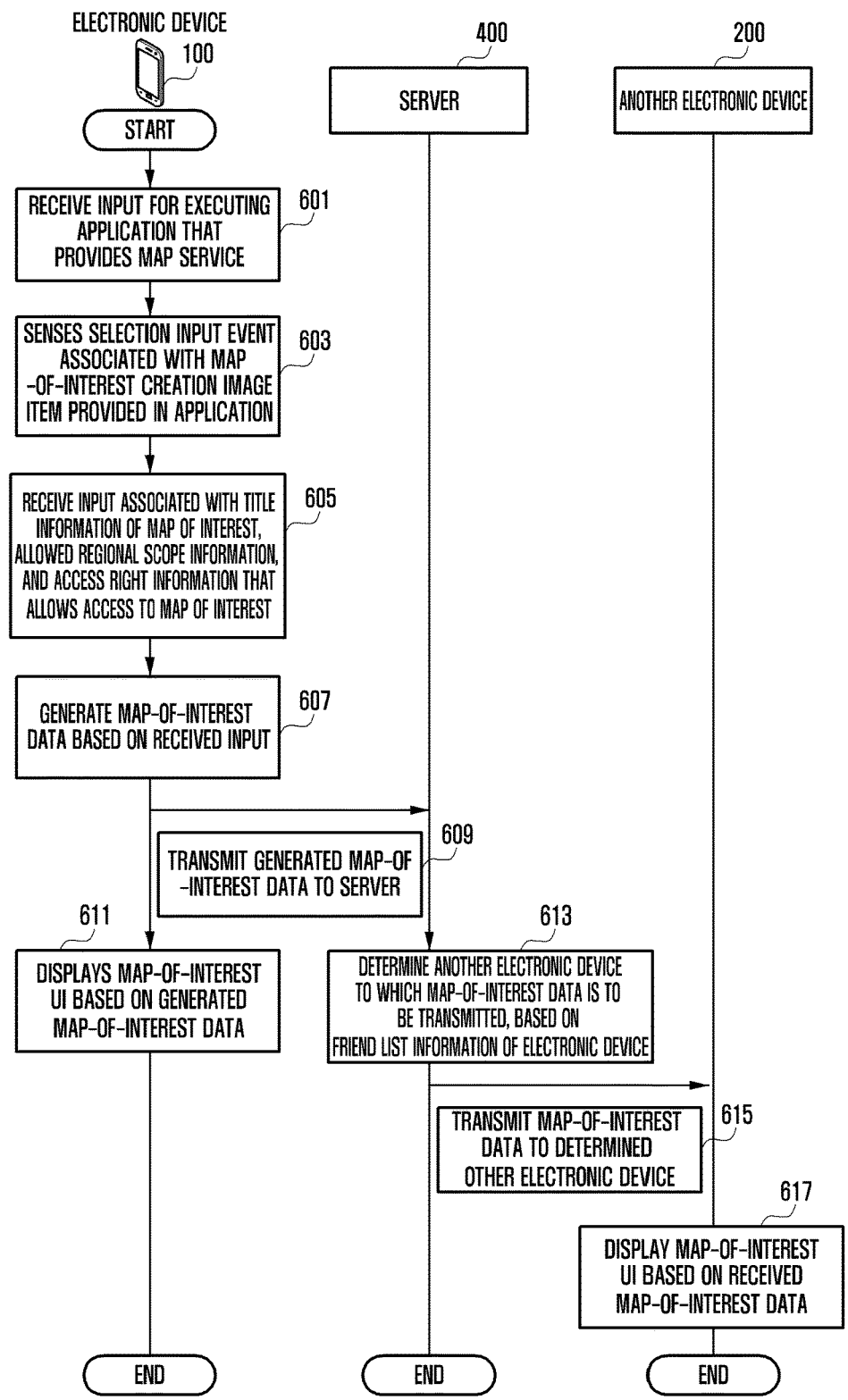
FIG. 6 is a flowchart illustrating a process of generating a map of interest through an electronic device, a server, and another electronic device according to various embodiments of the present disclosure.

FIG. 6 is a flowchart illustrating a process of generating a map of interest through an electronic device, such as the electronic device 100 of FIG. 1, a server, such as the server 400 of FIG. 1, and another electronic device, such as the electronic device 200 of FIG. 1, according to various embodiments of the present disclosure.

Referring to FIG. 6, in operation 601, the electronic device 100 receives an input for executing an application that provides a map service. In operation 603, the electronic device 100 senses a selection input event associated with a map-of-interest creation image item provided in the application.

In operation 605, the electronic device 100 receives an input associated with title information of a map of interest, allowed regional scope information, and access right information that allows access to the map of interest. For example, the electronic device 100 may sense an input even through the display module 150.

In operation 607, the electronic device 100 generates map-of-interest data based on the received input. In operation 609, the electronic device 100 transmits the generated map-of-interest data to the server 400. In operation 611, the electronic device 100 displays a map-of-interest UI based on the generated map-of-interest data.

In operation 613, the server 400 determines another electronic device to which the map-of-interest data is to be transmitted, based on the friend list information of the electronic device 100. Here, the friend list information may be information generated by one of the services of the application that provides a map service. For example, the friend list information may be ID information of other electronic devices, in association with access right information that allows access to the generated map-of-interest data.

In operation 615, the server 400 transmits the map-of-interest data to the determined other electronic device 200. In operation 617, the other electronic device 200 displays a map-of-interest UI based on the received map-of-interest data. The map-of-interest UI displayed in the other electronic device 200 may be an image item screen corresponding to location information, allowed regional scope information, and the like included in the map-of-interest data generated by the electronic device 100.

Figure 7:
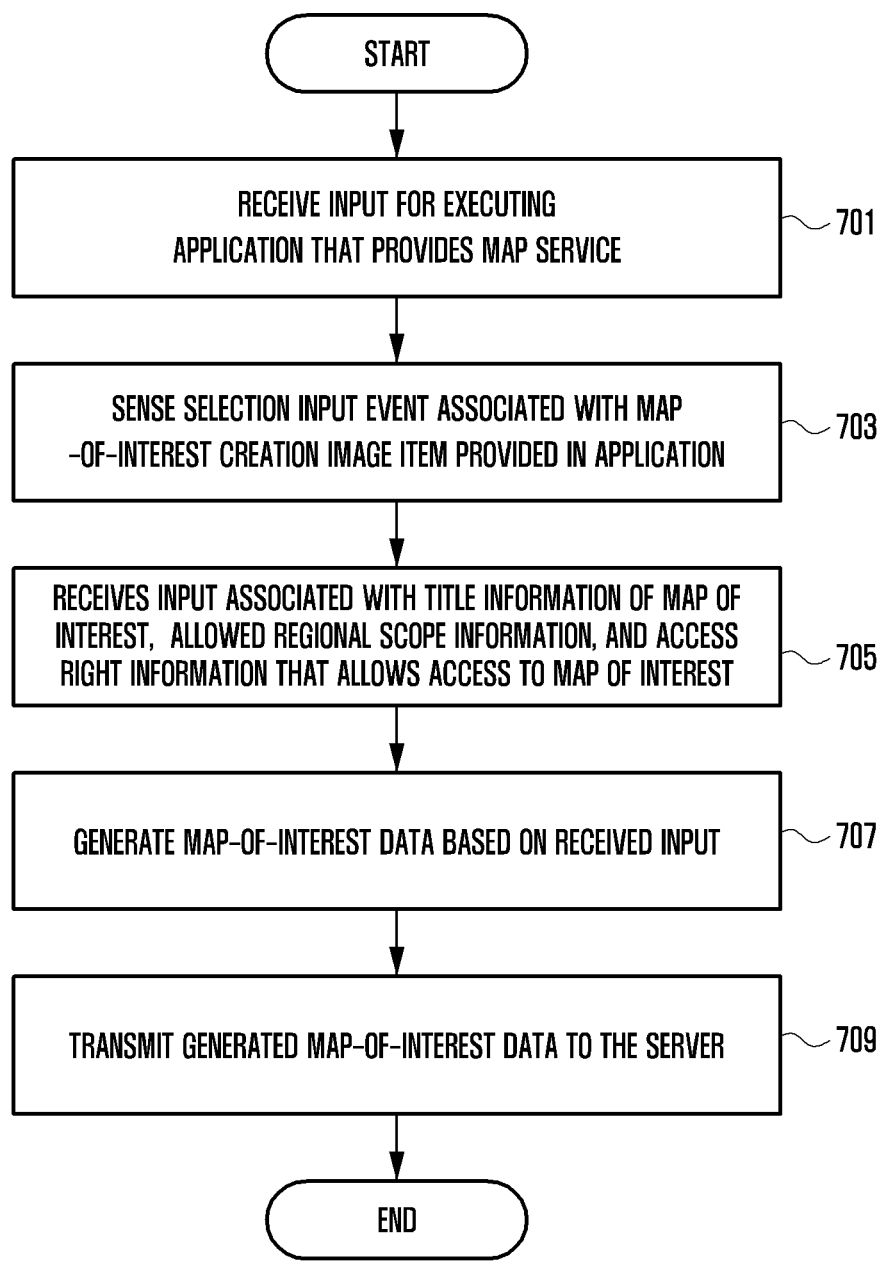
FIG. 7 is a flowchart illustrating a process of generating a map of interest of an electronic device according to various embodiments of the present disclosure.

FIG. 7 is a flowchart illustrating a process of generating a map of interest of an electronic device, such as the electronic device 100 of FIG. 1, according to various embodiments of the present disclosure.

Referring to FIG. 7, in operation 701, the electronic device 100 receives an input for executing an application that provides a map service. In operation 703, the electronic device 100 senses a selection input event associated with a map-of-interest creation image item provided in the application. In operation 705, the electronic device 100 receives an input associated with title information of a map of interest, allowed regional scope information, and access right information that allows access to the map of interest.

In operation 707, the electronic device 100 generates map-of-interest data based on the received input. In operation 709, the electronic device 100 transmits the generated map-of-interest data to the server 400.

Figure 8:
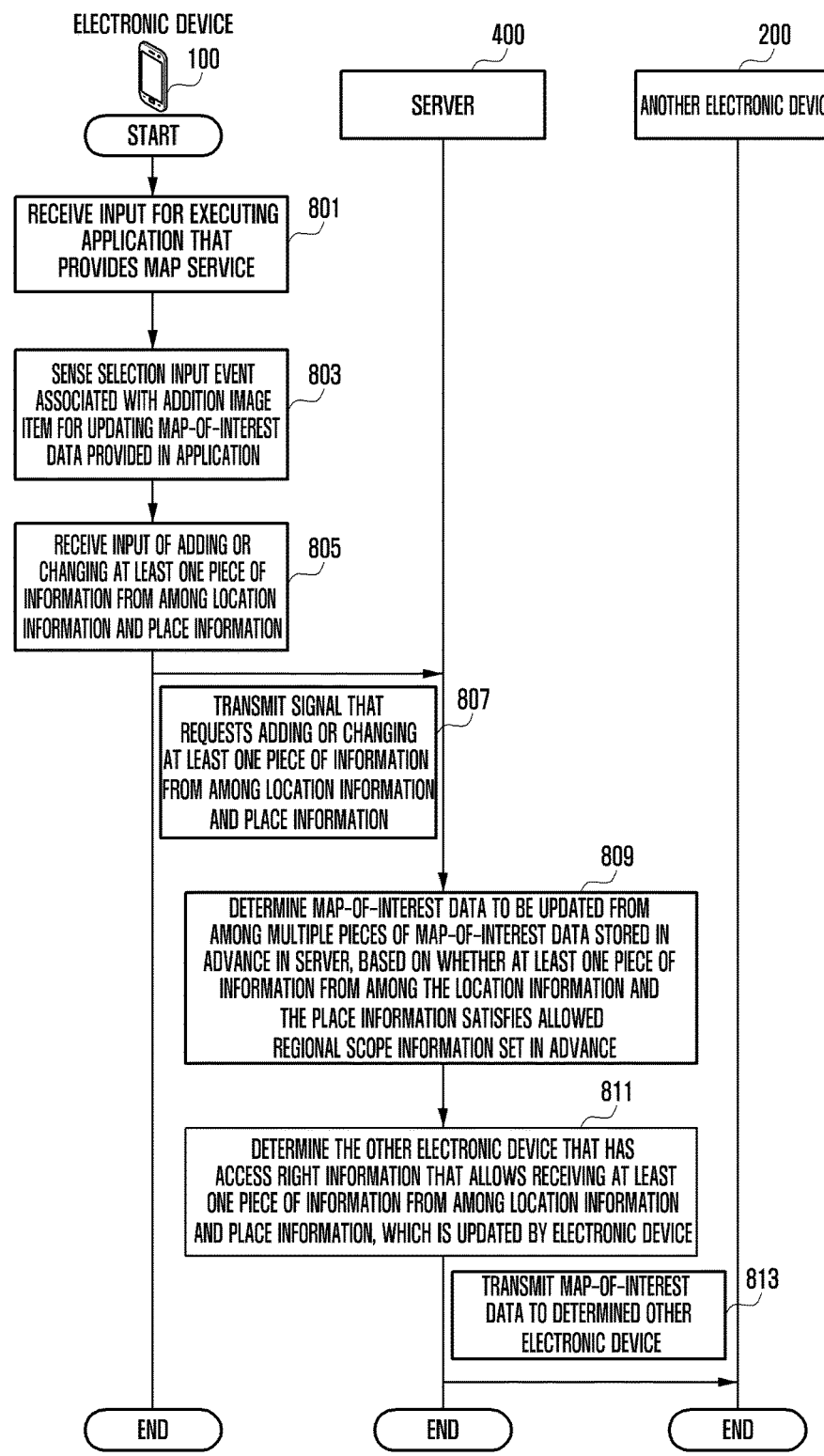
FIG. 8 is a flowchart illustrating a process of changing location information, place information, or the like in map-of-interest data generated through an electronic device, a server, and another electronic device according to various embodiments of the present disclosure.

FIG. 8 is a flowchart illustrating a process of changing location information, place information, or the like in map-of-interest data generated through an electronic device, such as the electronic device 100 of FIG. 1, a server, such as the server 400 of FIG. 1, and another electronic device, such as the electronic device 200 of FIG. 1, according to various embodiments of the present disclosure.

Referring to FIG. 8, in operation 801, the electronic device 100 receives an input for executing an application that provides a map service. In operation 803, the electronic device 100 senses a selection input event associated with an addition image item for updating map-of-interest data provided in the application.

In operation 805, the electronic device 100 receives an input of adding or changing at least one piece of information from among location information and place information. The processor 100, according to an embodiment of the present disclosure, may activate the camera module 140 or may establish a connection with a location-based social network service when a selection input event associated with the addition image item is sensed, which updates the map-of-interest data provided in the application.

The electronic device 100, according to an embodiment of the present disclosure, may receive image information through the camera module 140 when the camera module 140 is activated. The electronic device 100 may receive an input associated with the received image information, location information, and place information. For example, the location information and the place information may be automatically input through a GPS module or the like.

The electronic device 100, according to an embodiment of the present disclosure, may search for at least one piece of information from among location information and place information, through the location-based social network service. The retrieved information may be received by working together with the location-based social network service.

In operation 807, the electronic device 100 transmits, to the server 400, a signal that requests adding or changing at least one piece of information from among location information and place information. In operation 809, the server 400, according to an embodiment of the present disclosure, may determine map-of-interest data to be updated from among multiple pieces of map-of-interest data stored in advance in the server 400, based on whether the at least one piece of information from among the location information and the place information satisfies allowed regional scope information set in advance. For example, the server 400 may determine whether location information added by the electronic device 100 corresponds to a location within the allowed regional scope set in advance in the map-of-interest data stored in advance in the server 400. The server 400 may determine map-of-interest data to be updated, based on a determination result.

In operation 811, the server 400 determines the other electronic device 200 that has access right information that allows receiving the at least one piece of information from among the location information and the place information, which is updated by the electronic device 100. In operation 813, the server 400 transmits the map-of-interest data to the determined other electronic device 200.

Figure 9:
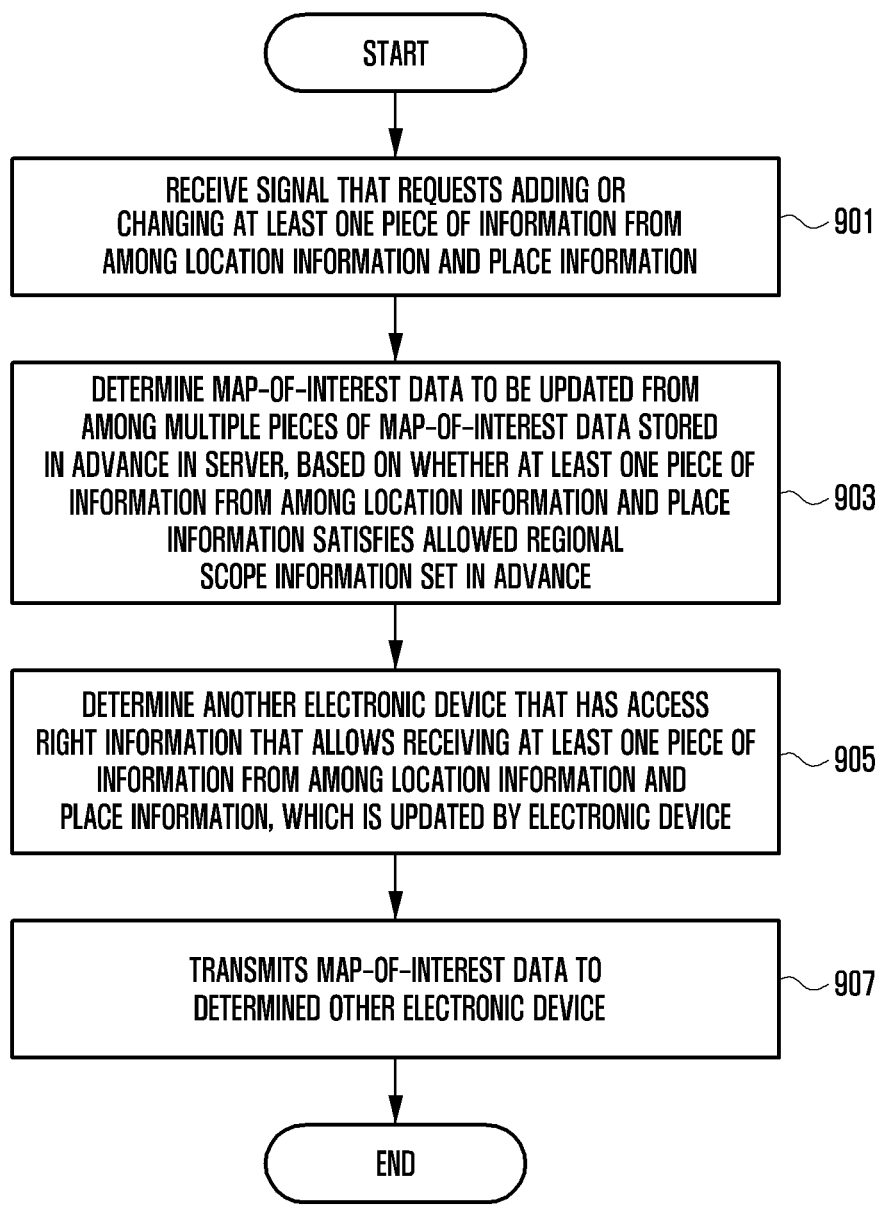
FIG. 9 is a flowchart illustrating a process in which a server changes location information, place information, or the like stored in map-of-interest data according to various embodiments of the present disclosure.

FIG. 9 is a flowchart illustrating a process in which a server, such as the server 400 of FIG. 1, changes location information, place information, or the like stored in map-of-interest data according to various embodiments of the present disclosure.

Referring to FIG. 9, in operation 901, the server 400 receives a signal that requests adding or changing at least one piece of information from among location information and place information. In operation 903, the server 400 determines map-of-interest data to be updated from among multiple pieces of map-of-interest data stored in advance in the server 400, based on whether the at least one piece of information from among the location information and the place information satisfies allowed regional scope information set in advance.

In operation 905, the server 400 determines another electronic device 200 that has access right information that allows receiving the at least one piece of information from among location information and place information, which is updated by the electronic device 100. In operation 907, the server 400 transmits the map-of-interest data to the determined other electronic device 200.

Figure 10:
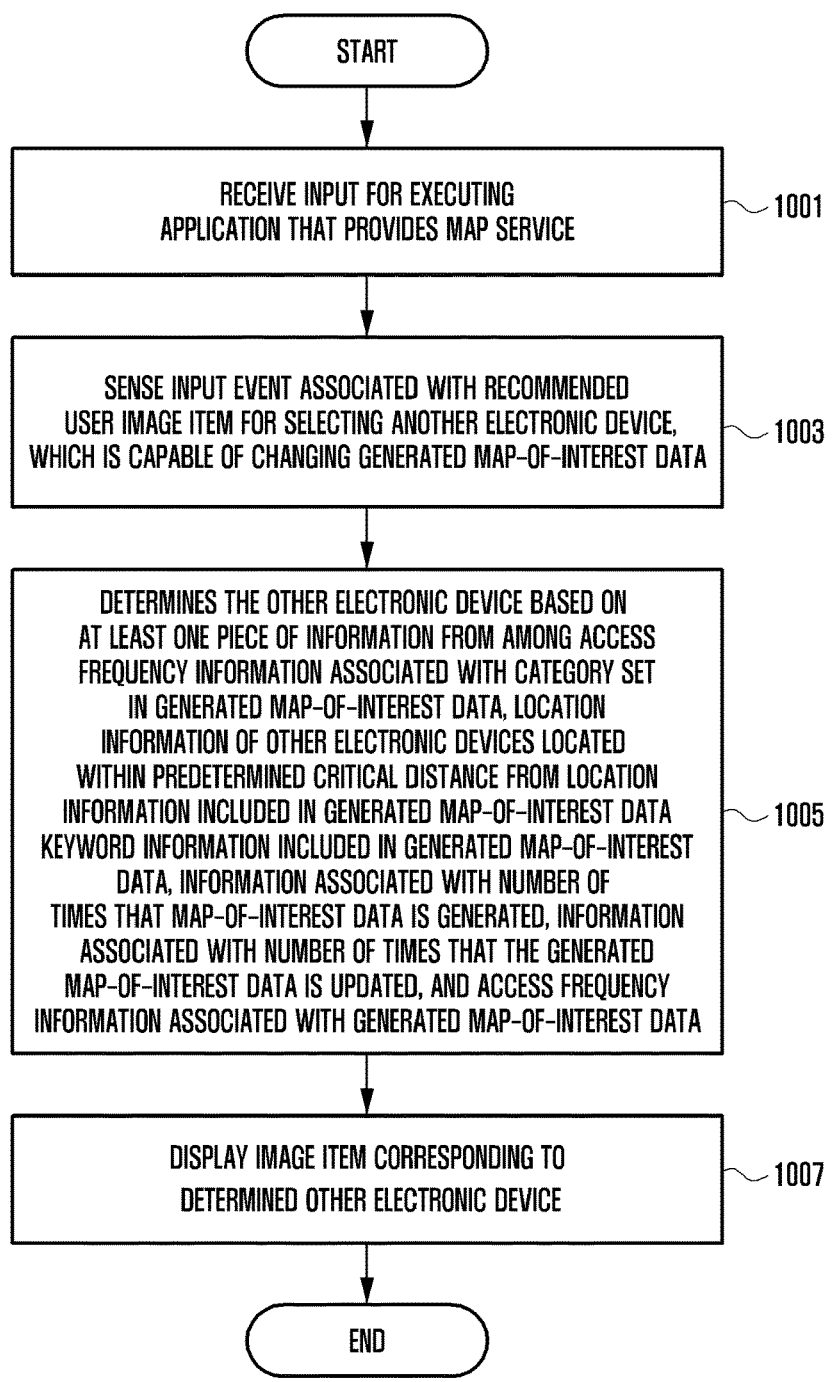
FIG. 10 is a flowchart illustrating a process in which an electronic device selects a user of a recommended electronic device according to various embodiments of the present disclosure.

FIG. 10 is a flowchart illustrating a process in which an electronic device, such as the electronic device 100 of FIG. 1, selects a user of a recommended electronic device according to various embodiments of the present disclosure.

Referring to FIG. 10, in operation 1001, the electronic device 100 receives an input for executing an application that provides a map service. In operation 1003, the electronic device 100 senses an input event associated with a recommended user image item for selecting another electronic device (the electronic device 200), which is capable of changing generated map-of-interest data.

In operation 1005, the electronic device 100 determines the other electronic device 200 based on at least one piece of information from among access frequency information associated with a category set in generated map-of-interest data, location information of other electronic devices located within a predetermined critical distance from location information included in the generated map-of-interest data, keyword information included in the generated map-of-interest data, information associated with the number of times that map-of-interest data is generated, information associated with the number of times that the generated map-of-interest data is updated, and access frequency information associated with the generated data.

In operation 1007, the electronic device 100 displays an image item corresponding to the determined other electronic device.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations which have been known or are to be developed in the future.

According to various embodiments of the present disclosure, at least part of a device (e.g., modules or functions thereof) or a method (e.g., operations) according to the present disclosure be implemented, for example, by an instruction stored in a computer-readable storage media in a form of a programming module. When the instruction is executed by at least one processor (e.g., the processor 160), the at least one processor may perform a function corresponding to the instruction. The computer readable storage media may be, for example, the memory 130.

At least part of the programming module may be implemented (e.g., executed) by, for example, the processor 160. At least part of the programming module may include, for example, a module, a program, a routine, sets of instructions and/or a process, or the like to perform one or more functions.

The computer-readable storage media may include magnetic media such as hard disk, floppy disk, or magnetic tape, optical media such as compact disc read only memory (CD-ROM) or digital versatile disc (DVD), magneto-optical media such as floptical disk, and a hardware device such as ROM, random access memory (RAM), or flash memory for storing and executing program commands (e.g., a programming module). Further, the program command may include a machine language code created by a compiler and a high-level language code executable by a computer using an interpreter. The foregoing hardware device may be configured to be operated according to at least one software module to perform an operation of the present disclosure, or software modules may be configured to be operated according to the hardware device.

The programming module according to the present disclosure may include at least one of the aforementioned elements, or may omit a part of the aforementioned elements, or may further include additional different elements. The operations performed by the programming module according to the present disclosure or other elements may be executed by a sequential, a parallel, an iterative, or a heuristics method. In addition, some operations may be executed in a different order, or may be omitted, or may add other operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one processor configured to:
      receive a first input for executing an application that provides a map service,
      sense a selection input event associated with a creation image item of a map-of-interest provided in the application,
      receive a second input including title information of the map-of-interest, allowed regional scope information, and access right information that allows access to the map-of-interest,
      generate map-of-interest data based on the received second input, and
      control a display to display a map-of-interest user interface (UI) based on the generated map-of-interest data; and
   a transceiver configured to transmit the generated map-of-interest data to a server,
   wherein, when an image item corresponding to map-of-interest data generated by another electronic device is displayed, an input event is sensed that selects a subscription image item for receiving information associated with the map-of-interest data included in the displayed image item, and the map-of-interest data corresponding to the selected subscription image item is updated, and wherein the at least one processor is further configured to control the transceiver to receive the updated map-of-interest data from the server.

2. The electronic device of claim 1, wherein, when the at least one processor senses a selection input event associated with an addition image item which updates the map-of-interest data provided in the application, the at least one processor is further configured to at least one of:

activate a camera, or control the transceiver to establish a connection to a location-based social network service.

3. The electronic device of claim 2, wherein, when the at least one processor activates the camera, the at least one processor is further configured to:

receive a third input associated with at least one piece of information from among location information, place information, and image information associated with an image input through the camera; and control the transceiver to transmit data generated based on the received third input to the server.

4. The electronic device of claim 2, wherein, when the at least one processor establishes the connection to the location-based social network service through the transceiver, the at least one processor is further configured to:

control the transceiver to transmit, to the server, at least one piece of information from among location information and place information retrieved through the location-based social network service.

5. The electronic device of claim 1, wherein, when another electronic device updates the generated map-of-interest data, a notification signal is generated;

wherein the transceiver is further configured to receive, from the server, the notification signal that is generated as the generated map-of-interest data is updated by the other electronic device; and wherein the at least one processor is further configured to control the display to display an image item corresponding to the notification signal, based on the received notification signal.

6. The electronic device of claim 1, wherein, when an input event associated with a recommended user image item is sensed, which selects another electronic device that is capable of changing the generated map-of-interest data, the at least one processor is further configured to:

determine the other electronic device based on at least one of:

access frequency information associated with a category that is set in the generated map-of-interest data, location information of other electronic devices located within a predetermined critical distance from location information included in the generated map-of-interest data, keyword information included in the generated map-of-interest data, information associated with the number of times that map-of-interest data is generated, information associated with the number of times that the generated map-of-interest data is updated, or access frequency information associated with the generated map-of-interest data; and control the display to display an image item corresponding to the determined other electronic device.

7. A method of generating a map by an electronic device, the method comprising:

receiving, by at least one processor, a first input for executing an application that provides a map service;

sensing, by the at least one processor, a selection input event associated with a creation image item of a map-of-interest provided in the application;

receiving, by the at least one processor, a second input including title information of the map-of-interest, allowed regional scope information, and access right information that allows access to the map-of-interest;

generating, by the at least one processor, map-of-interest data based on the received second input;

controlling, by the at least one processor, a display to display a map-of-interest user interface (UI) based on the generated map-of-interest data;

transmitting, by a transceiver, the generated map-of-interest data to a server, displaying, by the at least one processor, an image item corresponding to map-of-interest data generated by another electronic device;

sensing, by the at least one processor, an input event that selects a subscription image item for receiving the map-of-interest data included in the displayed image item; and when the map-of-interest data corresponding to the selected subscription image item is updated, controlling, by the at least one processor, the transceiver to receive the updated map-of-interest data.

8. The method of claim 7, wherein, when the at least one processor senses a selection input event associated with an addition image item which updates the map-of-interest data provided in the application, the method further comprises at least one of:

activating a camera, or establishing a connection to a location-based social network service through the transceiver.

9. The method of claim 8, wherein the activating of the camera comprises:

receiving, by the at least one processor, a third input associated with at least one piece of information from among location information, place information, and image information of an image input through the camera; and controlling, by the at least one processor, the transceiver to transmit data generated based on the received third input to the server.

10. The method of claim 8, wherein the establishing of the connection to the location-based social network service through the transceiver comprises:

controlling, by the at least one processor, the transceiver to transmit, to the server, at least one piece of information from among location information and place information which are retrieved through the location-based social network service.

11. The method of claim 7, further comprising:

updating the generated map-of-interest data by another electronic device and generating a notification signal;

receiving, by the transceiver from the server, the notification signal that is generated as the generated map-of-interest data is updated by another electronic device; and controlling, by the at least one processor, the display to display an image item corresponding to the notification signal, based on the received notification signal.

12. The method of claim 7, wherein, when the at least one processor senses an input event associated with a recommended user image item, which selects another electronic device that is capable of changing the generated map-of-interest data, the method further comprising:
    determining the other electronic device based on at least one of:
        access frequency information associated with a category that is set in the generated map-of-interest data,
        location information of other electronic devices located within a predetermined critical distance from location information included in the generated map-of-interest data,
        keyword information included in the generated map-of-interest data, information associated with the number of times that map-of-interest data is generated, information associated with the number of times that the generated map-of-interest data is updated, or
        access frequency information associated with the generated map-of-interest data; and
    controlling the display to display an image item corresponding to the determined other electronic device.

\* \* \* \* \*